Dec. 8, 1925.
A. R. STEVENSON, JR
1,565,030
SYSTEM OF POWER TRANSMISSION
Filed Dec. 27. 1923
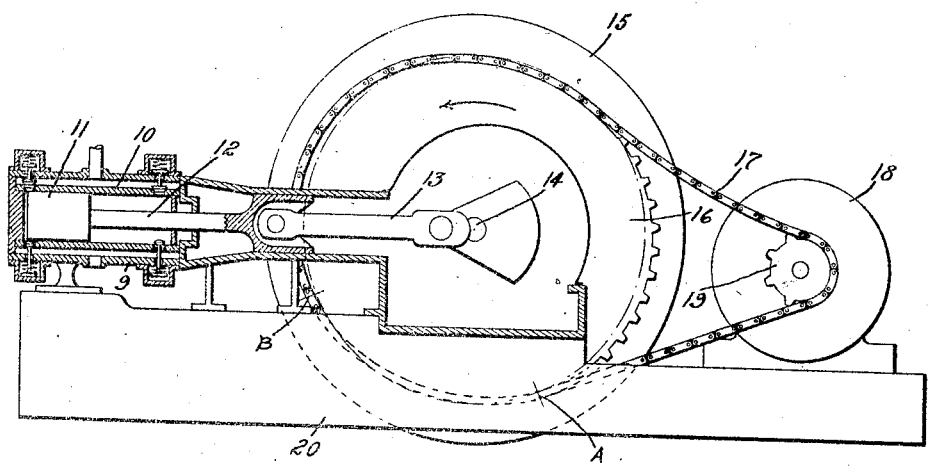
Inventor:
Alexander R. Stevenson, Jr.
by
His Attorney.

Patented Dec. 8, 1925.

1,565,030

UNITED STATES PATENT OFFICE.

ALEXANDER R. STEVENSON, JR., OF SCHENECTADY, NEW YORK, ASSIGNOR TO GENERAL ELECTRIC COMPANY, A CORPORATION OF NEW YORK.

SYSTEM OF POWER TRANSMISSION.

Application filed December 27, 1923. Serial No. 683,049.

*To all whom it may concern:*

Be it known that I, ALEXANDER R. STEVENSON, Jr., a citizen of the United States, residing at Schenectady, in the county of Schenectady, State of New York, have invented certain new and useful Improvements in Systems of Power Transmission, of which the following is a specification.

My invention relates to a system of power transmission wherein a motor having a constant speed, as for instance, a synchronous motor, is applied to drive a fluctuating load, such as a reciprocating compressor or pump.

The object of my invention is to provide a system of power transmission which will absorb power at a constant rate from the driving motor and apply it to the driven apparatus in accordance with the fluctuations in the power required by the driven apparatus.

My invention is particulary useful in alternating current systems wherein it is desired to use synchronous motors, which by reason of their electrical characteristics are used, not only for the purpose of driving the load, but to improve the power factor of the line from which the power is taken. Further advantages to be obtained by the use of synchronous motors are that they operate at higher efficiencies and are cheaper than other types of alternating current motors when operating at the low speeds such as are encountered in driving pumps and compressors. A good example of such a system is where a synchronous motor is applied to drive a reciprocating compressor or pump. In such a system, as is well known, the load created by the compressor or pump will be small at the start of a stroke and as the piston advances the load will increase due to the compression in the cylinder and as these changes in load take place, they will tend to set up a varying angular velocity in the rotating parts of the synchronous motor, which will cause the motor current to vary in value as the angular displacement of the rotating parts vary with respect to the rotating magnetic field of the motor.

Synchronous motors when driving fluctuating loads such as suggested above, are as is well known, very liable to give trouble in operating, owing to an action known as "hunting", which consists in periodic variations of the angular velocity of the rotating parts of the motor, and is often accompanied by excessive periodic interchanges of current between the motor and the line, and sometimes these periodic variations in the angular velocity of the rotating parts of the motor are sufficient to pull the rotating parts out of step with the rotating field of the motor and as a result cause it to stop.

Heretofore the amount of the fluctuations in current taken from the power lines by an electric motor when connected to such a load has been reduced by attaching a fly-wheel to the motor or motor driven apparatus and by this means the peaks of the load have been reduced to some extent, but even with this expedient, the motor will continue to draw a fluctuating current from the power supply lines. This is due to the fact that the fly-wheel in order to help the motor during the peak load periods, must slow down, and to store the energy so delivered it must speed up. As the fly-wheel slows down it will slow down the motor and increase the angular displacement of its rotor with respect to the rotating magnetic field of the stator, and consequently increase the amount of current which will be taken from the power line. During the other extreme of the cycle the conditions will be reversed, as the motor will only have to drive the fly-wheel and driven apparatus without load. Under these conditions the motor will speed up and decrease the angular displacement of the rotor with respect to the rotating magnetic field, and thus, decrease the amount of current taken from the line by the motor. From the above it therefore, will be evident that the addition of a fly-wheel as a load steadying means can at best, only reduce the magnitude of the variations in the current taken by the motor from the line.

In accordance with my invention I have obviated the difficulties heretofore encountered and reduced the size of the fly-wheel heretofore necessary, when applying a rotatable driving means to a periodically fluctuating load, by providing connecting means which will cause an energy storing mass, such as a fly-wheel, to accelerate and absorb energy from the driving means and decelerate to deliver energy to the driven apparatus as the load on the driven apparatus varies, and at the same time permit the speed on the driving means to be maintained substantially constant.

It is well known to those skilled in the art, that the power which will be consumed by an accelerating mass depends upon the weight of the mass and the rate of change in speed, and that the power which will be delivered by a decelerating mass, also depends upon the weight of the mass and the rate of change in speed. In order to take advantage of the above, and at the same time connect the mass to a substantially constant speed driving means, I provide, in accordance with my invention, a connecting means which will permit the relative changes in the speed of the mass to take place without affecting the speed or load of the rotatable driving means. The connecting means which I have provided has a varying radius of power application, and is so arranged with respect to the varying load cycle of the driven apparatus, that the rate of change in the speed of the mass, during the acceleration period, is a maximum when the load on the driven apparatus is a minimum, and the rate of change in the speed of the mass, during the decelerating period, is a maximum when the load upon the driven apparatus is a maximum, while the driving means operates at substantially constant speed and load.

For a better understanding of my invention reference may be had to the following description taken in connection with the accompanying drawing in which the single figure discloses diagrammatically one embodiment of my invention.

In the drawing, I have shown a power transmission system in which a device 9, to be driven, the load of which varies during its cycle of operation, is provided with a fly-wheel 15 and is driven by a constant speed motor 18 through a driving connection which imparts an accelerating and decelerating movement to the fly-wheel and driven device while the speed and torque of the motor remains substantially constant. Device 9 is shown as a double acting compressor, such as an ammonia compressor, having a cylinder 10, a piston 11, and a piston rod 12. Connected between the piston rod 12 and a shaft 14 is a connecting rod 13 which transforms the rotary motion of the shaft 14 into reciprocating motion in the piston 11. Mounted upon the shaft 14 is a fly-wheel 15 and an irregular shaped driving wheel or sprocket 16, which for purpose of clearness, is shown with its deviations from circular symmetry, slightly exaggerated. I have found by calculation that a variation of from 2½% to 5% in the radius of the irregular sprocket 16 above and below the true or average radius will in most cases considerably reduce the size of fly-wheel required for successful operation. A suitable chain 17 is shown connecting the irregular sprocket 16 to the driving motor 18, which is of the synchronous type. The various elements of the drawing are shown as mounted upon a common base 20.

The operation of my invention is as follows: It is known to those skilled in the art to which my invention pertains that the duty cycle of a double acting compressor, such as I have illustrated in the drawing, is substantially the same irrespective of the direction of stroke of the piston 11. I shall therefore, for the purpose of clearness, only describe the operations of my device during one stroke of the piston, it being understood that a somewhat similar cycle of operation will occur during the reverse stroke of the piston. Assume that the compressor 9 is operating and is just beginning to compress the ammonia in the right-hand end of the cylinder 10. At this point of the load-cycle the energy required to drive the compressor will be relatively small, but steadily increasing in magnitude, while the load created by the acceleration of the fly-wheel 15 will be at a maximum and steadily decreasing to a minimum in value. These variations in the load created by the compressor are due to the compression of the ammonia within the cylinder 10, and the variations in the load created by the fly-wheel 15 are due to the changes in the rate of change in the speed of the fly-wheel which are caused by the variations in the length of the radius of the irregular sprocket 16 at the point where the chain leaves it and the fact that the linear speed of the chain 17 is substantially constant. In the position shown in the drawing the compressor load is small, and the rate of change in speed of the fly-wheel 15 in the accelerating direction is a maximum, due to the fact that the rate of change in the radius of the sprocket 16 at the point of last chain contact, point A, is a maximum; this therefore causes the fly-wheel load to be at a maximum. After the fly-wheel 15 has rotated counterclockwise through an angle of approximately 90°, it will then be seen by referring to the drawing that the point B will be in last contact with the chain 17 and that the load created by the compressor 9, at this point would be at a maximum. At this point the rate of change in the speed of the fly-wheel 15, in the decelerating direction, is a maximum due to the fact that the rate of change in the radius of the sprocket 16 at the point B, where the chain 17 makes last contact, would be a maximum. This permits a maximum deceleration of the fly-wheel 15, and consequently a maximum delivery of absorbed power toward driving the compressor 9.

Reference is made to the point of last contact of the chain 17 with the sprocket 16 because, at this point, the radius of the sprocket is perpendicular to the chain, and since the chain speed is substantially constant it will be seen that the angular velocity of the fly-wheel 15 and sprocket 16 will be proportional to this radius. It is not intended to imply that the last tooth to make contact carries all the load, because this is not the case. There is enough stretch in the chain so that the load is distributed over more than one tooth, but the radius to the tooth of last contact determines the angular velocity of the sprocket and fly-wheel. The tooth, of last contact, is understood to mean the tooth where the radius from the center of the sprocket is perpendicular to the line of the tight side of the chain between the driving and driven sprockets.

From the above it will be evident to those skilled in the art that, when the minimum radius of the sprocket 16 is at the point of last contact, the fly-wheel 15 will be running at a maximum speed, and that at this point the acceleration changes from positive to negative, or, to deceleration, and therefore passes through a zero value. Since the acceleration is zero, the fly-wheel at this point will neither absorb nor give up energy. Similarly, when the maximum radius of the sprocket 16 is at the point of last contact, the fly-wheel will be running at a minimum speed. At this point the acceleration changes from negative to positive and therefore, passes through a zero point at which time the fly-wheel will again, neither absorb nor give up energy. The maximum acceleration and maximum deceleration points, A and B, respectively, are located as shown, somewhere between the maximum and minimum radius of the irregular sprocket 16, their exact location depending upon the character of the duty cycle of the driven apparatus.

By properly designing the irregular sprocket 16 it is possible by reason of its irregularity, to balance the loads created by the compressor 9 under heavy load and the decelerating fly-wheel load against the compressor 9 under light load and the accelerating fly-wheel load, so that a constant load and speed is always maintained on the driving motor 18. In the drawing, the sprocket 16 is shown as located upon the shaft 14 with its longest axis rotated approximately 15° in a clockwise direction with respect to the dead center of the compressor 9. With the sprocket 16 located as shown, the points having the greatest rate of change in radius, will be the points of last contact with the chain 17, when the load created by the driven apparatus is a maximum or a minimum. Thus, when the point A on the sprocket 16 is in last contact with the chain 17 as shown in the drawing, the rate of change in the radius of the sprocket 16 is substantially at a maximum, in the accelerating direction, and the fly-wheel 15 will be absorbing a maximum of energy from the driving motor 18. As the sprocket 16 rotates, in the direction of the arrow, a change in its radius will again take place and the rate of change will be at approximately a maximum in the decelerating direction when the point B of the sprocket 16 comes in last contact with the chain 17. At this point the fly-wheel 15 will be delivering approximately a maximum of energy to the driven apparatus 9. This rate of change of the radius to the point of last contact with the chain 17, will vary periodically during the duty cycle of the driven apparatus and, as described above, will maintain the combined load, created by the compressor 9 and the fly-wheel 15 substantially constant.

I have therefore as a result of the unsymmetrical sprocket 16 in this embodiment of my invention produced, from a constant speed driving motor 18, an accelerating and decelerating movement in the fly-wheel 15 which when located as described and shown in the drawing will permit the fly-wheel 15 to absorb energy when the load due to the compressor 9 is light and subsequently give up this stored energy to the compressor 9 when its load is heavy, and at the same time permit the driving motor 18 to run at all times during the operating cycle at a substantially constant speed.

While I have for purposes of illustration shown my invention as applied to a system in which an electric motor is applied to drive a double acting ammonia compressor, it should be understood that I do not limit my invention to this particular application nor do I limit it to the particular means or arrangement shown, as the same results can be obtained by other means, such for example as, a belt and unsymmetrical pulley, a worm and unsymmetrical worm gear or a cam and a system of levers.

What I claim as new and desire to secure by Letters Patent of the United States, is:—

1. In a system of power transmission, the combination of a substantially constant-speed rotatable driving motor, a power consuming device having a fluctuating duty cycle, and means having a varying radius of power application connecting said motor and said power consuming device and co-operating with the latter for maintaining the load on and the speed of said driving motor substantially constant.

2. In a system of power transmission, the combination of a rotatable driving motor, a power consuming device having a fluctuating duty cycle, an energy storing mass connected to said device, and means having a varying radius of power application connecting said motor and said device for periodically causing energy to be stored and delivered to compensate for said power fluctuations to thus maintain the load on and the speed of the driving motor substantially constant.

3. In combination, reciprocating apparatus, a fly-wheel connected thereto, a constant speed rotatable motor, and means having a varying radius of power application connecting said motor to said reciprocating apparatus and fly-wheel adapted to maintain the angular velocity of said motor substantially constant during the complete operating cycle of said reciprocating apparatus.

4. In a system of power transmission, a device having a load which fluctuates during its cycle of operation, a fly-wheel connected to said device, a constant speed rotatable motor for driving said device and fly-wheel, and a power transmitting means between said fly-wheel and motor, characterized by the feature that the radius of power application changes as the fly-wheel periodically accelerates to absorb power from the motor and periodically decelerates to restore power to the device without substantially affecting the load on the driving motor.

5. In a system of power transmission, the combination of a rotatable driving motor, a device to be driven having a load which fluctuates during its cycle of operation, an energy storing mass connected to said device, and connecting means between said motor and said device having a varying radius of power application for periodically imparting an accelerating and decelerating movement to said device and energy storing mass during its cycle of operation while said driving motor operates at a substantially constant load and speed.

6. In a system of power transmission, the combination of a driving motor, a device to be driven having a load which fluctuates during its cycle of operation, an energy storing mass connected to said device, and means connecting said motor to said device and energy storing mass comprising an unsymmetrical wheel rigidly connected to said mass and so arranged with respect to the varying load periods that the energy storing mass will absorb and restore power to said device while the load on and the speed of the driving motor remains substantially constant.

7. In a system of power transmission, the combination of a driving motor, a device to be driven having a load which fluctuates during its cycle of operation, a fly-wheel connected to said device, and means connecting said motor to said device comprising an unsymmetrical wheel rigidly connected to said fly wheel and so arranged with respect to the varying load periods that the fly-wheel will absorb and restore power to said device while the load on and the speed of the driving motor remains substantially constant.

8. In a system of power transmission, a device to be driven having a load which fluctuates during its cycle of operation, a rotatable driving motor, an energy storing mass adapted to accelerate and decelerate connected to said device, and means forming a driving connection between said device and said motor having a variable radius of power application, the rate of change of said radius, during the acceleration of said energy storing mass, being a maximum when the load on said driven device is a minimum, and a maximum in the decelerating direction when the load on said device is a maximum.

9. In a system of power transmission, a device having a load which periodically fluctuates during its operating cycle; a rotatable driving means, a fly-wheel connected to said device, an unsymmetrical sprocket connected to said fly-wheel, and a chain co-operating with and connecting said sprocket to said constant speed driving means, said sprocket imparting an accelerating and a decelerating movement to said fly-wheel and said device.

10. In a system of power transmission, the combination of a synchronous motor for supplying power to said transmission system, a power consuming device having a fluctuating duty cycle, an energy storing mass connected to said device, and means having a varying radius of power application connecting said motor and said device for periodically causing energy to be stored and delivered to compensate for said fluctuations to thus maintain the load on said motor substantially constant.

In witness whereof, I have hereunto set my hand this 26th day of December, 1923.

ALEXANDER R. STEVENSON, Jr.